(No Model.)
M. JORDAN.
CAR WHEEL AND AXLE.
No. 296,017.  Patented Apr. 1, 1884.
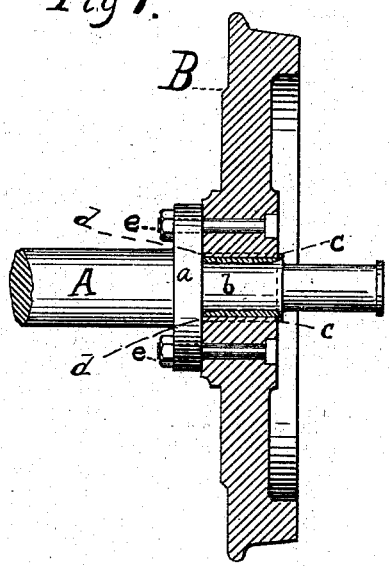
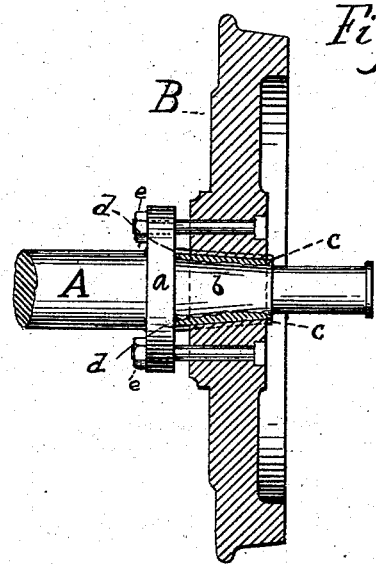
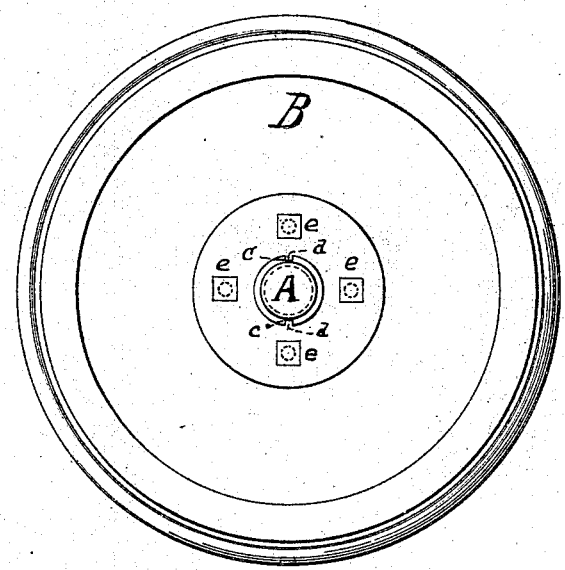
Witnesses
Geo. Wadman
Davis Provost
Inventor
Michael Jordan
per atty
John W. Kouvalinka

United States Patent Office.

MICHAEL JORDAN, OF SCRANTON, PA., ASSIGNOR OF ONE-FOURTH TO OTTO SCHREIFER AND JOHN F. CONNOLLY, BOTH OF SAME PLACE.

CAR WHEEL AND AXLE.

SPECIFICATION forming part of Letters Patent No. 296,017, dated April 1, 1884.

Application filed July 27, 1883. (No model.)

*To all whom it may concern:*

Be it known that I, MICHAEL JORDAN, of the city of Scranton, in the county of Lackawanna and State of Pennsylvania, have invented certain new and Improved Means for Attaching Car-Wheels to their Axles, of which the following is a specification.

The mode of attaching cast-metal car-wheels to their axles as at present practiced consists in turning a true bearing upon the axle and a corresponding bearing upon the wheel, and then forcing the wheel upon the axle by pressure. This process is an expensive and laborious one, and tends to impair the strength and durability of the wheel and axle. The wheels being thus forced upon the axle and held firmly, it frequently happens that when the journals of the axles become heated by friction there is no room for expansion, and the axle being prevented from conducting the heat and equalizing the same throughout its length, the result is that either the wheel bursts or the axle becomes crystallized and its particles disintegrated, thereby causing it to break.

The object of my invention is to obviate all these defects, and at the same time provide a simple and effective means of attaching car-wheels to their axles.

To this end my invention consists in the combination, with a car-axle having recesses or grooves in its wheel-bearings, and wheels having tongues corresponding in number and position to the grooves in the axle, and co-operating together so as to interlock the wheel upon the axle of fixed abutments on the axle, and bolts or analogous devices extending between the latter and the wheels for drawing and securing the wheels upon the axle, substantially as and in the manner hereinafter specified.

In the accompanying drawings, Figure 1 is a vertical sectional view of a side elevation of a car-wheel attached to an axle embodying my invention. Fig. 2 is a similar view of a modification of the same. Fig. 3 is an end view of an elevation of a car wheel and axle embodying my invention.

Similar letters of reference designate corresponding parts in all figures.

A designates a car-axle provided with fixed abutments or shoulders $a$, extending around it, and having its wheel-bearings $b$, provided with grooves or recesses $c\ c$ on opposite sides.

B is the car-wheel, having on its bearings the tongues $d\ d$, corresponding in size and position to the grooves $c\ c$ in the axle-bearing, and adapted to fit into and interlock with the latter when the wheel is slipped into place. The number of tongues and grooves may be increased or diminished, if desired. When the wheels B, provided with the tongues $d\ d$, are slipped upon the axle correspondingly provided with the recesses or grooves $c\ c$, the said tongues and grooves will interlock and prevent the wheel from rotating upon the axle. If the grooves and recesses are reversed, or the axle and wheel bearings are made tapering, polygonal, or other shape, so that the wheel-bearing and the axle-bearing will interlock, the same result will be obtained.

The bolts $e\ e$, extending between the abutments or shoulders $a$ and the wheels B, are preferably employed to tighten and draw the wheels upon the axle. By screwing up these bolts the wheels are drawn close up to the shoulders or abutments upon the axle and held there, rendering it impossible for them to slip or become displaced.

By the use of my invention car-wheels may be quickly replaced in case of accident, and can be applied much more economically and made equally as secure as by the old process, and all danger from the bursting of the wheels or breaking of the axle by crystallization is obviated.

This patent is not intended to cover the specific form of my invention described in my United States Letters Patent No. 269,942, dated January 2, 1883, and set forth in the claims thereof.

What I claim as new, and desire to secure by Letters Patent, is—

The combination, with a car-axle having recesses or grooves in its wheel-bearings, and wheels having tongues corresponding in number and position to the grooves in the axle, and co-operating together, so as to interlock the wheel upon the axle, of fixed abutments on the axle, and bolts or analogous devices extending between the latter, and the wheels for drawing and securing the wheels upon the axle, substantially as and for the purpose specified.

MICHAEL JORDAN.

Witnesses:
  JNO. F. CONNOLLY,
  JOSEPH O'BRIEN.